United States Patent [19]

Fujita et al.

[11] Patent Number: 4,873,045
[45] Date of Patent: Oct. 10, 1989

[54] METHOD FOR MANUFACTURING AUTOMOTIVE INTERIOR COMPONENTS

[75] Inventors: Zenzo Fujita, Fujisawa; Hirokiyo Morita, Atsugi; Sadao Morishita, Ebina, all of Japan

[73] Assignee: Kasai Kogyo Co., Ltd., Tokyo, Japan

[21] Appl. No.: 172,407

[22] Filed: Mar. 24, 1988

[30] Foreign Application Priority Data

Jul. 14, 1987 [JP] Japan .......................... 62-175460

[51] Int. Cl.$^4$ .......................................... B29C 43/20
[52] U.S. Cl. ................................ 264/259; 264/257; 156/244.24
[58] Field of Search ....................... 264/257, 259; 156/244.11, 244.24, 244.27, 245

[56] References Cited

U.S. PATENT DOCUMENTS

| | | | |
|---|---|---|---|
| 2,835,924 | 5/1958 | Schmeling | 264/259 |
| 4,581,272 | 4/1986 | Walters et al. | 156/245 |
| 4,769,278 | 9/1988 | Kamimura et al. | 156/245 |

FOREIGN PATENT DOCUMENTS

| | | | |
|---|---|---|---|
| 10056702 | 1/1982 | European Pat. Off. | |
| 60-063138 | 4/1985 | Japan | 264/259 |
| 61-127320 | 6/1986 | Japan | 264/259 |
| 62-053811 | 3/1987 | Japan | 264/259 |
| 62-181111 | 8/1987 | Japan | 264/259 |
| 397283 | 7/1932 | United Kingdom | |

Primary Examiner—Jan H. Silbaugh
Assistant Examiner—Allan R. Kuhns
Attorney, Agent, or Firm—Wegner & Bretschneider

[57] ABSTRACT

A method for manufacturing automotive interior component parts, including the steps of: positioning a skin layer, having a back liner cushioning layer, on a mold surface of an upper mold with the cushioning layer facing downward; extruding a sheet of semi-molten thermoplastic resin material serving as a core layer directly onto a mold surface of a lower mold; clamping together the upper and the lower mold in such a manner that the core layer and the skin layer are bonded together with the cushioning layer interposed therebetween. Since the core material is sufficiently soft when it is bonded to the skin layer and the cushioning layer provides a buffer for the press pressure and a barrier against the infiltration of the soft core material, the skin layer is given with a very smooth surface even when it is made of porous material such as fabric. Additionally, since the core material is directly extruded onto a core surface, the pressure and the temperature involved the press forming process may be low.

4 Claims, 5 Drawing Sheets

METHOD FOR MANUFACTURING AUTOMOTIVE INTERIOR COMPONENTS

TECHNICAL FIELD

The present invention relates to automotive interior component parts such as automotive door trims, rear side trims, rear parcel shelves, etc., and in particular to a method for manufacturing automotive interior component parts in which a skin layer and a core layer are integrally press formed into an interior component part having a certain shape.

BACKGROUND OF THE INVENTION

Automotive interior components such as automotive door trims, rear side trims, rear parcel shelves, etc. are typically provided with a layered structure comprising a core layer having a certain rigidity and a skin layer having an ornamental or attractive surface texture which is bonded to the surface of the core layer. Conventionally, an interior component part of a desired shape was obtained by softening a thermoplastic resin plate or a thermoplastic composite resin plate, serving as a core layer, by heating it, laminating a skin layer consisting of a sheet of non-woven fabric or resin material over the core layer, and cold press forming this assembly.

To the end of reducing the labor and the time required for manufacturing such interior components, a certain method was proposed in Japanese Patent Publication No. 61-32142. According to this metod, an exterior sheet 1 is placed on a lower press mold 3 and blocks of thermoplastic resin material 2, for instance, consisting of polyolefin resin material or the like, are placed on the exterior sheet 1 as shown in FIG. 5. Then, an upper press mold 4 is lowered over the lower press mold 3 and they are clamped together to squeeze the thermoplastic material 2 into a sheet therebetween as shown in FIG. 6. As a result, the exterior sheet 1 and the thermoplastic material 2 are integrally bonded together and this assembly is given a desired shape as shown in FIG. 7.

To the end of achieving a satisfactory bonding between the core layer which typically consists of polyolefin resin and the exterior sheet having a poor mutual bonding capability, the reverse surface of the exterior sheet 1 is typically laminated with a fibrous layer 1b' consisting of fibrous material such as a non-woven fabric lining.

This method can achieve a considerable saving in labor but the material of the exterior sheet 1 is limited to non-porous resin sheet material such as a polyvinyl chloride sheet and, if a porous material such as cloth, carpet, non-woven fabric etc. is used, the excessive clamping pressure would cause the molten resin material to infiltrate through the space between the fibers of the exterior sheet to the external surface, thereby severely impairing the external appearance of the assembly.

Thus, according to this conventional method, the skin layer is required to be made of non-porous material and a severe restriction is therefore imposed on material selection.

Further, for press forming blocks of thermoplastic resin material into a sheet, a considerably high pressure and temperature are required so that the thermoplastic resin material tends to infiltrate through the fibrous material and, although a strong bonding may be achieved by the interlocking of the two materials, the surface of the exterior sheet 1 suffers from surface irregularities due to the infiltration of the thermoplastic resin into the space between the fibers of the exterior sheet, thus impairing the appearance and the fuel of the external surface.

BRIEF SUMMARY OF THE INVENTION

In view of such shortcomings of the prior art, a primary object of the present invention is to reduce the time and labor required in manufacturing automotive interior components by integrally assembling a core layer and a skin layer by press forming and, in particular, to provide a method for manufacturing automotive interior components which permits the use of porous material having a soft feel, such as cloth, carpet, non-woven fabric and other fabric materials as a skin layer.

A second object of the present invention is to provide a method for manufacturing automotive interior components which permits the use of porous material for the skin layer and offers a favorable appearance and feel.

A third object of the present invention is to provide a method for manufacturing automotive interior components which can produce an external surface free from surface irregularities.

These and other objects of the present invention can be accomplished by providing a method for manufacturing automotive interior component parts, comprising the steps of: positioning a skin layer, having a back liner consisting of a cushioning layer, on a mold surface of an upper mold with the cushioning layer facing downward; extruding a sheet of semi-molten thermoplastic resin material serving as a core layer directly onto a mold surface of a lower mold; clamping together the upper and the lower mold in such a manner that the core layer and the skin layer are bonded together with the cushioning layer interposed therebetween.

Since the core material which is directly extruded onto the mold surface is sufficiently soft when it is bonded to the skin layer and the cushioning layer provides a buffer for the press pressure and a barrier against the infiltration of the soft core material, the skin layer is given with a very smooth surface even when it is made of porous material such as fabric. Additionally, since the core material is directly extruded onto a core surface, the pressure and the temperature involved the press forming process may be low.

The sheet of semi-molten thermoplastic resin material can be conveniently placed on the mold surface if an outlet of an extruder is moved relative to the mold surface in such a manner that the speed of the relative motion between the outlet of the extruder and the mold surface is substantially equal to the speed at which the sheet of semi-molten thermoplastic resin material is extruded from the outlet. The outlet of the extruder may consist of a die communicated with a screw extruder by way of articulated tubing.

The skin layer may consist of porous material such as fabric. The cushioning layer consists of urethane foam. If the core layer is made of polyolefin resin while the cushioning layer consists of polyolefin foam, a favorable bonding can be achieved therebetween.

Thus, according to the present invention, automotive components of laminated structure are manufactured simply by squeezing semi-molten resin material over a mold surface of a lower mold for cold press, lowering an upper mold for cold press having skin layer set up thereto, and clamping the two parts of the mold together. Therefore, according to the present invention, a considerable advantage is obtained as compared to the conventional method in which core layer such as a thermoplastic resin plate or a thermoplastic composite resin plate is softened by heating as a separate process and setting it up on a lower mold for cold press.

Further as compared to the method disclosed in Japanese Patent Publication No. 60-32142 in which a block of resin material is squeezed into a sheet, since the resin material is formed into a sheet in advance and the cushion material relieves the press pressure according to the present invention, the pressure and the temperature for the press forming process may be low and the freedom in material selection is drastically increased since the material is not limited to non-porous material but may be soft fabric material such as cloth, carpet, non-woven fabric and other materials having a soft feel.

Additionally, since the cushioning material serves as a barrier against the infiltration of the molten resin, the surface of the skin layer or the surface of the final product is free from any irregularities and the feel and the appearance of the component are much improved.

BRIEF DESCRIPTION OF THE DRAWINGS

Now an embodiment of the present invention IS described in the following with reference being made to the appended drawings, in which:

FIGS. 5 through 7 show a prior art process, FIGS. 5 and 6 illustrating a conventional molding process while FIG. 7 is a sectional view showing a product made by this conventional molding method.

DETAILED DESCRIPTION OF THE PREFERRED EMBODIMENT

Figure 1:
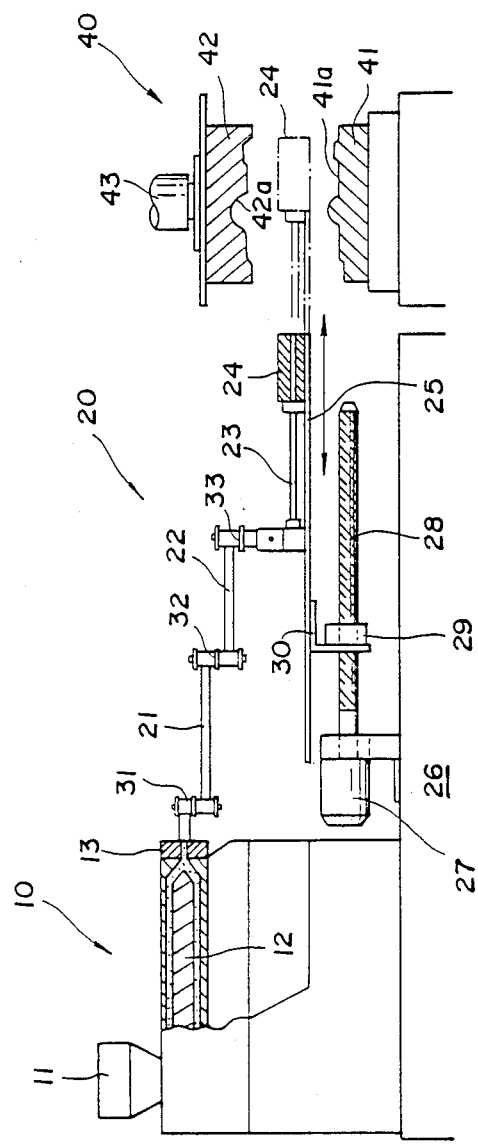
FIG. 1 is an illustrative view showing the general structure of an embodiment of the apparatus for implementing the method of the present invention.
Figure 2:
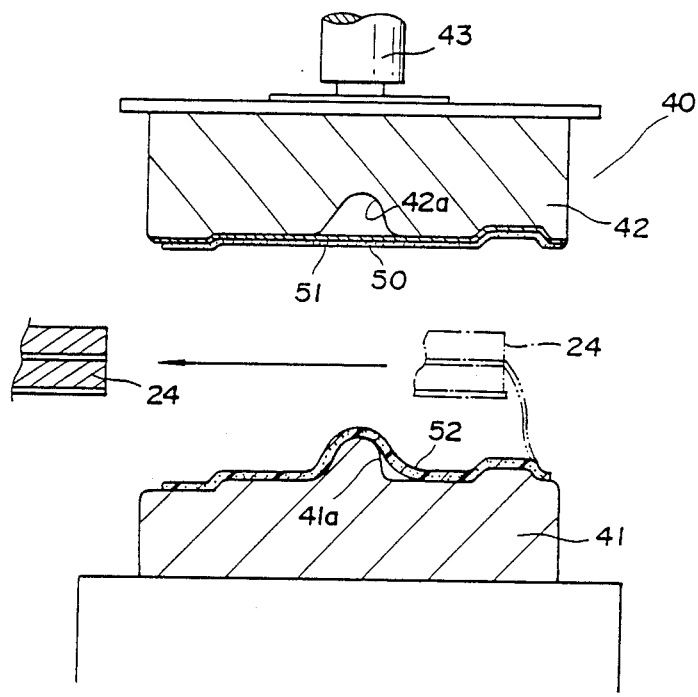
FIGS. 2 and 3 are sectional views of a forming mold showing different steps of the method of the present invention.
Figure 3:
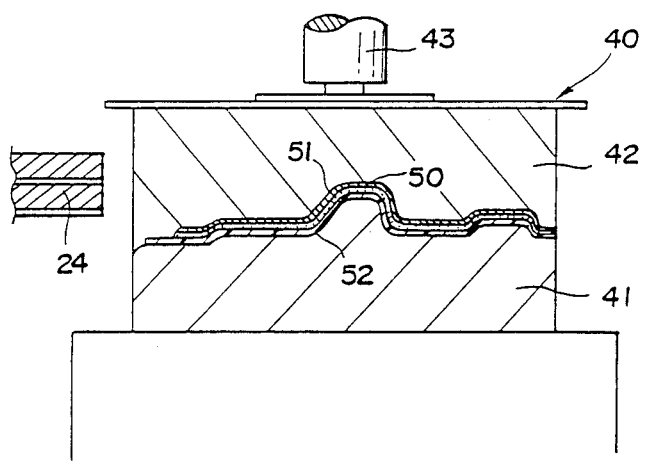
Figure 4:
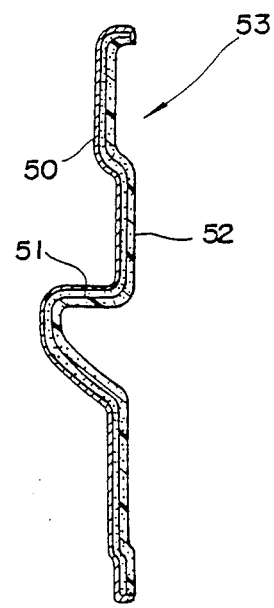
FIG. 4 is a sectional view showing an automotive door trim which is formed by the method of the present invention.
Figure 5:
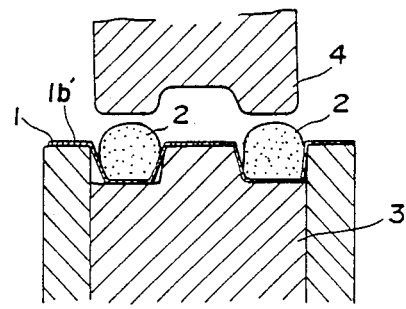
Figure 6:
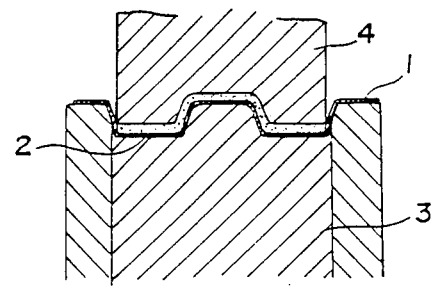
Figure 7:
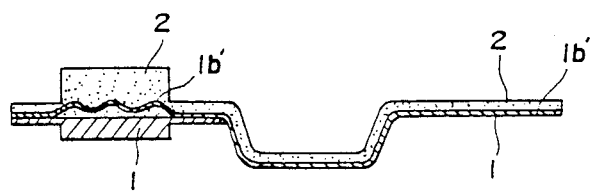

FIG. 1 is an illustrative view showing the general structure of the device for implementing the method of the present invention; FIGS. 2 and 3 are sectional views showing different steps of the method of the present invention; and FIG. 4 is a sectional view showing an automotive interior component part which is formed by the method of the present invention.

In FIG. 1, the apparatus for implementing the method of the present invention generally consists of an extruder 10, a movable die unit 20 and a mold press 40. First of all, the extruder 10 comprises a hopper 11 for supplying pellets of thermoplastic resin material into the main part of the extruder 10. If desired, filler such as wood powder may be mixed with the thermoplastic resin material. This extruder includes a screw or auger unit 12 comprising a heated barrel, a single screw or auger received, and a breaker plate 13 provided at a terminal end of the barrel for feeding the material to the movable die unit 20 from an orifice provided therein.

In the moveable die unit 20, molten resin is supplied from the breaker plate 13 of the extruder 10 to a die 24 for supplying sheet material by way of a first through a third supply tube 21, 22 and 23. The die 24 and the third supply tube 23 are securely fixed to the upper surface of a movable base 25 which is in turn adapted to move relative to a fixed table 26 in the direction indicated by an arrow in FIG. 1. In this embodiment, a servometer 27 is mounted to the fixed table 26 and a screw rod 28 is attached to the output shaft of the servomotor 27. A ball nut 29 which threads with the screw rod 28 is attached to the lower surface of the moveable base 25 by way of a bracket 30.

Thus, as the servomotor 27 is turned, the moveable base 25 moves in a reciprocating manner by a stroke which depends on the rotational speed and the rotational direction of the servomotor 27, by way of the feed screw mechanism consisting of the screw rod 28 and the ball nut 29, and the die 24 for supplying sheet material moves likewise in a reciprocating manner following the motion of the moveable base 25.

Following the reciprocating motion of the die 24 for supplying sheet material, the first supply tube 21 and the second supply tube 22 are allowed to move in the fashion of a pair of mutually pivoted links in a plane parallel to the major surface of the moveable base 25 or the fixed table 26. To the end of accomplishing this motion, there are provided hinges 31 through 33 between adjacent ones of the supply tubes 21 through 23 in such a manner that, as a result of the motion of the first and the second supply tube 21 and 22 in the fashion of a pair of links, molten resin is continuously introduced from the breaker plate 13 to the die 24 for supplying sheet material following the reciprocating motion of the die 24 for supplying sheet material.

The die 24 for supplying sheet material consists of a wide die which is generally called as a T-die; the molten resin is slightly chilled by this die 24 and is fed out from the tip of this die 24 as a semi-molten sheet.

Although it is not illustrated, the moveable base 25 is adapted to smoothly reciprocate by means of a guide member provided in the fixed table 26.

The mold press 40 is provided adjacent to the fixed table 26 which supports the moveable die unit 20 and is comprised of a lower cold press mold 41 having a mold surface 41a of a desired contour and an upper cold press mold 42 having a similar mold surface 42a. The upper mold 42 is adapted to move vertically relative to the lower mold 41 by means of a drive unit such as a hydraulic cylinder unit 43.

As the die 24 reciprocates, carried by the moveable die unit 20, the die 24 moves along the mold surface of the lower cold press mold 41 between the position interposed between the upper and the lower mold 41 and 42 as indicated by a chain dot line in FIG. 1 and the position out of the space between the upper and the lower mold 41 and 42 as indicated by a solid line in FIG. 1.

The drive unit for the moveable die 24 consisted of a ball screw mechanism using the servomotor 27 and the feed screw rod 28 in the present embodiment, but, instead, a hydraulic cylinder may be directly connected to the moveable die 24 for achieving the reciprocating motion.

Now the process of manufacturing an automotive component, in this case a door trim, using the above described apparatus is described in the following.

First of all, as shown in FIG. 2, a skin layer 50 consisting of cloth, non-woven fabric or the like is set up on the mold surface 42a of the upper cold press mold 42. This skin layer 50 has a laminated structure with a cushioning layer 51, such as a layer of polyurethane foam, lined to the reverse surface of the skin layer 50.

Then, a mixture of polyolefin resin and wood powder filler at a suitable ratio is melted in the extruder 10 by heating and the molten thermoplastic resin, introduced into the die 24 by way of the first through the third articulated supply tubes 21, 22 and 23, is slightly chilled before it is finally extruded onto the mold surface 41 of the lower cold press mold 41a in the form of semi-molten sheet material. This semi-molten sheet of thermoplastic resin serves as the core layer 52.

Then, the upper cold press mold 42 is lowered over the lower mold 41 and, by clamping together the two parts of the mold, a sheet of the core layer 52 is press formed into the shape given by the mold surfaces 41a and 42a of the press mold while the skin layer 50 is integrally bonded to the core layer 52 with the cushion layer 51 interposed therebetween.

After the elapse of a certain cooling time period, the upper cold press mold 42 is lifted by the action of the hydraulic cylinder 43 and a door trim 53 formed into a desired shape may now be taken out from the lower mold 41 as shown in FIG. 4.

Thus, according to the present invention, as shown in FIG. 2, since the semi-molten thermoplastic resin material which is extruded from the extruder 10 is directly pushed onto the mold surface 41a of the lower cold press mold 41 by means of the moveable die unit 20, a considerable improvement in the production efficiency can be achieved as compared to the conventional method in which sheet material is softened by heating before it is set upon the press mold.

Since the skin layer 50 comprises a back lining of cushion layer 51 such as polyurethane foam laminated to the reverse surface of the skin layer and this cushion layer 51 serves as a barrier for preventing the infiltration of the core layer 52 to the external surface, the material for the skin layer may consist of porous material such as cloth, carpet, non-woven fabric as well as a resin sheet consisting of polyvinyl chloride, polyvinyl chloride foam or the like, thus eliminating the limitations on the material selection.

As for the conditions for the press forming process illustrated in FIG. 3, the temperatures of the metallic cold press molds 41 and 42 and the die 24 for supplying sheet material may be from room temperature to 60° C. and from 160° C. to 180° C., respectively, while the press pressure may be from 30 to 50 kg/cm$^2$. Thus, since the temperatures and the pressure involved are so low the skin layer 50 would not suffer from unfavorable influences from the press pressure and the temperature.

And, since the bonding between the core layer 52 and the skin layer 50 is accomplished by the molten resin infiltrating into the minute cells of the cushion layer consisting of a layer of polyurethane foam, an anchoring action is produced for secure bonding therebetween. Furthermore, since the thickness of the cushion layer 51 contributes to the elimination of the surface irregularities of the skin layer 50 and the cushion layer 51, it additionally serves as a barrier for preventing the semi-molten resin for the core layer 52 from infiltrating to the skin layer 50, and the appearance and the feel of the surface of the product are much improved.

If the material of the cushion layer 51 is selected to be polyolefin foam when the core layer is made of polyolefin resin as was the case in the present embodiment, an even stronger bonding can be accomplished due to the strong affinity therebetween in addition to the anchoring action mentioned earlier.

Thus, according to the present invention, since both the press pressure and the mold temperature may be low, unfavorable influences of heat and pressure to the skin layer are eliminated. Furthermore, since the cushioning layer which is laminated to the reverse surface of the skin layer uniformly distributes the press pessure over the entire surface of the skin layer, and the cushion layer serves as a barrier for preventing the infiltration of the molten resin forming the core layer to the skin layer, a satisfactory finish of the external surface of the skin layer is assured.

Thus, according to the present invention, the manufacturing process is simplified on the one hand while a greater freedom in material selection is accomplished and the appearance and the feel of the products are improved on the other hand.

Although the present invention has been shown and described with reference to the preferred embodiment thereof, it should not be considered as limited thereby. Various possible modifications and alterations could be conceived by one skilled in the art to any particular embodiment, without departing from the scope of the invention.

What is claimed is:

1. Method for cold press manufacturing automotive interior component parts, comprising the steps of:
    positioning a skin layer, having a back liner consisting of a foamed cushioning layer, on a mold surface of an upper cold press mold with the cushioning layer facing downward;
    extruding a sheet of semi-molten thermoplastic resin material serving as a core layer directly onto a mold surface of a lower cold press mold; and
    cold pressing by clamping together the upper mold and the lower mold in such a manner that the core layer and the skin layer are bonded together with the cushioning layer interposed therebetween, wherein the upper mold and the lower mold are at temperatures of from room temperature to 60° C. and the press pressure is from 30 to 50 kg/cm$^2$.

2. Method for manufacturing automotive interior component parts as defined in claim 1, wherein the skin layer consists of a porous material.

3. Method for manufacturing automotive interior component parts as defined in claim 2, wherein the cushioning layer consists of urethane foam.

4. Method for manufacturing automotive interior component parts as defined in claim 2, wherein the core layer consists polyolefin material and the cushioning layer consists of polyolefin foam.

* * * * *